June 27, 1967   D. C. SCHLUDERBERG   3,328,612
MAGNETOHYDRODYNAMIC ELECTRIC GENERATION
Filed April 9, 1964

INVENTOR.
Donald C. Schluderberg
BY
ATTORNEY

United States Patent Office 3,328,612
Patented June 27, 1967

3,328,612
MAGNETOHYDRODYNAMIC ELECTRIC GENERATION
Donald C. Schluderberg, Lynchburg, Va., assignor to The Babcock & Wilcox Company, New York, N.Y., a corporation of New York
Filed Apr. 9, 1964, Ser. No. 358,428
3 Claims. (Cl. 310—11)

ABSTRACT OF THE DISCLOSURE

A magnetohydrodynamic generator wherein the motive fluid passed therethrough is provided with minute particles of graphite to improve the electrical conductivity of the motive fluid and to enhance the effectiveness of the generator.

This invention relates to the direct conversion of heat to electrical energy, and more particularly to magnetohydrodynamic electric power generation.

The theory of magnetohydrodynamic (MHD) electric power generation has been known for many years, but has had only limited application in laboratory models. A MHD generator makes use of a jet of elastic fluid which, to be effective, must be electrically conductive. An elastic fluid, such as a gas, can become electrically conductive by heating it to a temperature at which the gas forms a plasma, but the temperatures are generally too high to be practical with known materials. Proposals have been made to induce gas ionization to increase conductivity by subjecting the gas to a beam of electrons, or by the introduction of low ionization potential elements such as potassium, sodium, or caesium into the gas when it is at a relatively high temperature. However, only a small percentage of ionization of the gas is obtainable by these methods so that the electrical conductivity obtained is low and of little assistance in MHD applications. An example of an MHD generator is disclosed in U.S. Patent 3,102,224.

In the present invention an electrically conductive fluid is formed of an elastic fluid and a finely divided electrically conductive solid material which is suspended in the fluid. The elastic fluid may be a gas such as helium, carbon dioxide, or the like, and the solid suspended material may be graphite, or other conductive solids.

The graphite particles used in the suspension should have a size of about 5 microns and their maxium dimension should not exceed 10 microns. The quantity of graphite used may be of the order of 12 pounds per cubic foot of gas at 650 F. and a pressure of the order of 400 pounds per square inch gage. Increased quantities of graphite in the gas suspension, i.e. an increase in the density of the mixture, will increase the electrical conductivity.

Figure 1:
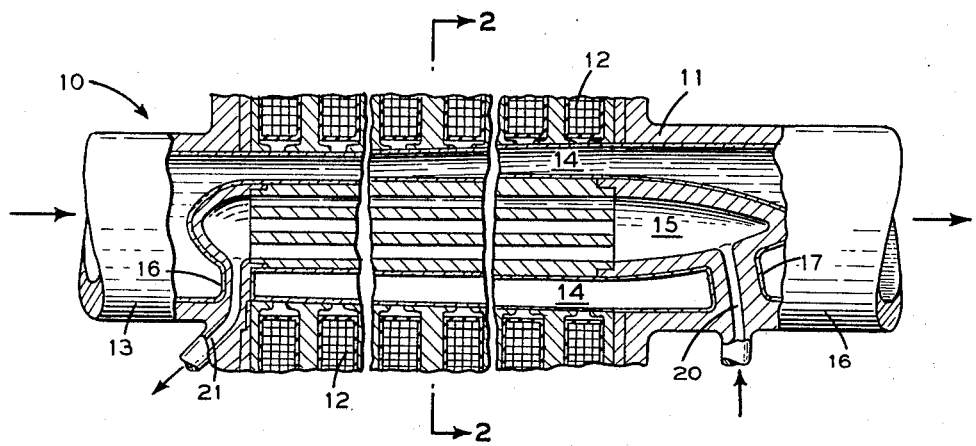
Figure 2:
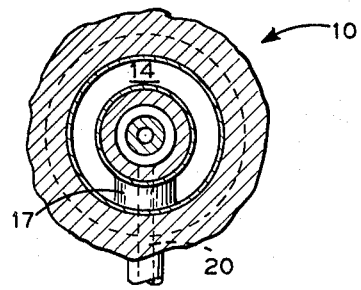

Of the drawings:

FIG. 1 illustrates a schematic representation of a magnetohydrodynamic electric generator usable with the conductive mixture of the present invention; and, FIG. 2 is a section taken on the line 2—2 of FIG. 1.

As shown, the generator 10 consists of an exterior shell 11 of heat resisting material in which coils 12 are mounted to generate a magnetic field or fields perpendicular to the direction of flow of the gas-graphite suspension mixture of the present invention. The suspension mixture enters the generator 10 at a superatmospheric pressure through an inlet 13 from an exterior source (not shown). The mixture flows through an annular passageway 14 formed between the exterior shell 11 and an internal core 15, and discharges through an outlet duct 16 to heat traps (not shown), if desired.

In the embodiment shown, the core 15 is supported in its designed axial and lateral position relative to the shell 11 by upstream and downstream struts 16 and 17, respectively. As shown, the struts and the core are fluid cooled by water, for example, which enters the core through a passageway 20 formed in the downstream strut 17 and discharges through a passageway 21 formed in the upstream strut 16.

The passage of the electrically conductive mixture of graphite suspended in gas through the MHD generator 10 tends to induce electrical currents due to the action of the magnetic field created by coils 12. The induced currents may be collected as an alternating current usable in an exterior load as taught by the Maeder Patent 3,102,- 224. Alternately, the shell 11 may be provided with insulated electrodes to pick up power generated by passing the electrically conductive fluid of the invention through the magnetic field. This power will be direct current which can be used as such, or converted to alternating current exteriorly of the generator 10.

Advantageously the effect of the passage of a mixture of electrically conductive particles in the motive fluid of a magnetohydrodynamic generator will be to reduce the temperature drop of the mixture by a factor of the order of 10. This is due to the thermodynamic effect of heat exchange from the graphite particles to the suspending gas. The effect of heat storage upon the thermodynamics of the expanding gas will be significant only if there is a very strong thermal bond between the particles and the gas. If very small particles are used, that is, below 5 microns, the particle surface is so large and the heat transfer coefficiently great so that the thermal bond will be appreciable. Such a thermodynamic effect has been experimentally demonstrated. The effect will be to reduce the entering mixture temperature to a few hundred degrees above the exit mixture temperature in the usual MHD installation. The pressurre drop of the relatively higher density mixture will ordinarily be greater than with gas alone. While the entering velocity of the mixture may approach the speed of sound, the addition of the particles in the gas tends to reduce the operating velocity required in an MHD unit while retaining power generating effectiveness.

By way of example, and not as a limitation, a typical MHD unit may require an entering gas temperature (with proper seeding for gas ionization) of 4500° F. and a leaving gas temperature of 3500° F. When using the suspension mixture of the present invention the entering mixture temperature may be in the range of 3600° F. to 3800° F., depending on the density of the conductive solids suspended in the gas, and have an exit temperature of the order of 3500° F.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

What is claimed is:

1. In a magnetohydrodynamic electric generator of the type in which a stream of elastic fluid is passed at high velocity through a magnetic field, the improvement which comprises increasing the electric conductivity of the elastic fluid by adding electrically conductive particles having a size in the low micron range to the elastic fluid before passing the mixture through the magnetic field.

2. In a magnetohydrodynamic electric generator of the type in which a high velocity stream of elastic fluid is passed through a magnetic field, the improvement which comprises increasing the electric conductivity of the elastic fluid by adding graphite particles of a size of about 5 microns to the elastic fluid before passing the mixture through the magnetic field.

3. In a magnetohydrodynamic electric generator of the type in which a stream of elastic fluid is passed through a magnetic field, the improvement which comprises increasing the electric conductivity of the elastic fluid by adding solid graphite particles of not over 10 microns size in an amount sufficient to provide a mixture density of the order of 12 pounds of graphite particles per cubic foot of mixture, and means for passing said mixture through said magnetic field.

References Cited
UNITED STATES PATENTS

| | | | |
|---|---|---|---|
| 2,210,918 | 8/1940 | Karlovitz | 310—11 |
| 3,139,551 | 6/1964 | Lary | 313—63 |
| 3,149,248 | 9/1964 | Valfells | 310—11 |

MILTON O. HIRSHFIELD, *Primary Examiner.*

DAVID X. SLINEY, *Examiner.*